INVENTOR
RAYMOND B. SIMS
BY
Henry C. Westin
ATTORNEY

Sept. 22, 1964 R. B. SIMS 3,149,404
METHOD OF ASSEMBLING BEARING SLEEVES
Filed May 31, 1961 4 Sheets-Sheet 2

INVENTOR
RAYMOND B. SIMS
BY
Henry A. Weston
ATTORNEY

Sept. 22, 1964        R. B. SIMS        3,149,404
METHOD OF ASSEMBLING BEARING SLEEVES Filed May 31, 1961        4 Sheets-Sheet 4

INVENTOR
RAYMOND B. SIMS
BY
ATTORNEY

United States Patent Office

3,149,404
Patented Sept. 22, 1964

3,149,404
METHOD OF ASSEMBLING BEARING SLEEVES
Raymond Bernard Sims, Sheffield, England, assignor to Davy and United Engineering Company Limited, Sheffield, England, a British company
Filed May 31, 1961, Ser. No. 115,592
3 Claims. (Cl. 29—148.4)

This invention relates to method of assembling bearing sleeves, for example for rolling mills and is particularly concerned with hydrodynamically lubricated bearings, such as those for rolls of rolling mills.

A well known form of bearing for rolling mills consists of a journal sleeve having a tapered bore and secured on the tapered neck of the roll by a key, and a bush secured within the chock for the roll. The sleeve is a heavy forging which is ground on its external surface to a mirror finish, prior to location on the roll neck, while the bush is made from a fabricated shell of about 1 inch thickness and having on the inner face of the shell a thin layer of white metal. This bearing has had great success for a number of years, but we have found that it has two disadvantages. Firstly, a roll mounted in such bearings is liable to rotate eccentrically and, secondly, the bush is frequently distorted from a true circular form because of the clearance between the bush and the mill chock. The relatively thin bush distorts under the heavy rolling loads until it conforms to the shape of the supporting surface in the chock. This tends to distort the shape of the load-carrying oil film which reduces the bearing capacity and can lead to bearing failure in extreme cases.

I have discovered that roll eccentricity is likely to be caused by any of three factors. Firstly, the keys securing the journal sleeves to the roll necks and their keyways are quickly damaged in service by frequent mounting and removal of the heavy bearing and, as a result, the sleeves are distorted and become eccentric. Secondly, the rigid sleeves are not necessarily truly round when they have been machined and they are of such heavy section that nothing can be done to render their surfaces truly cylindrical when they are mounted on the roll. Thirdly, after the roll is removed from its bearing, it is reground while being carried on trunnions provided at each end of the roll; as the roll necks are not necessarily coaxial with the trunnions, the roll barrel need not be coaxial with the journal sleeves.

I have also found that the variation in the clearance between the bushes and the co-operating journal sleeves is due to the clearance which is allowed between the bushes and the chocks in which they are mounted. The latter clearances are allowed for the purpose of mounting, but, when the mill is under load, the bushes are forced against the surfaces of the chocks as explained above, thereby eliminating the clearances and altering the separation of the bushes and sleeves.

According to the present invention there is provided a journal for a rotatable load bearing member, the journal comprising a thin sleeve secured to a part of the load bearing member only by being shrunk fitted thereto whereby the sleeve may be machined on the load bearing member and the load bearing member may be machined concentric with the sleeve, the load bearing member being mountable in a bearing without removal of the sleeve.

In accordance with another aspect of the invention, there is provided a journal for a rolling mill roll comprising a thin sleeve secured to the neck of the roll only by being shrunk fitted thereto whereby the sleeve may be machined on the neck of the roll and the roll may be machined concentric with the sleeve, the sleeve carrying the neck being mountable in a bearing without removal of the sleeve.

In accordance with another aspect of the invention, a method of making a journal for a rotatable load bearing member comprises shrink fitting a thin sleeve thereto machining the outer surface until it is truly round, then supporting the load bearing member on the sleeve and ensuring that the load bearing member is concentric with the sleeve, the load bearing member being mountable in a bearing without removal of the sleeve.

The invention also resides in a method of making a journal for a rolling mill roll comprising shrink fitting a thin sleeve onto a neck of the roll, machining the outer surface until it is truly round, then supporting the roll on the sleeve and ensuring that the roll is concentric with the sleeve, the roll neck being mountable in a bearing without removal of the sleeve.

In these embodiments it is preferred that the sleeve bore is tapered corresponding to a tapered part of the load bearing member or neck of the roll.

Preferably, the journal sleeve has mounted on it an oil seal adapted to prevent the lubricating oil from escaping over the barrel of the roll and onto the rolled material.

In order that the present invention may be more readily understood there will now be described two embodiments thereof given by way of example only reference being made to the accompanying drawings in which.

Figure 1:
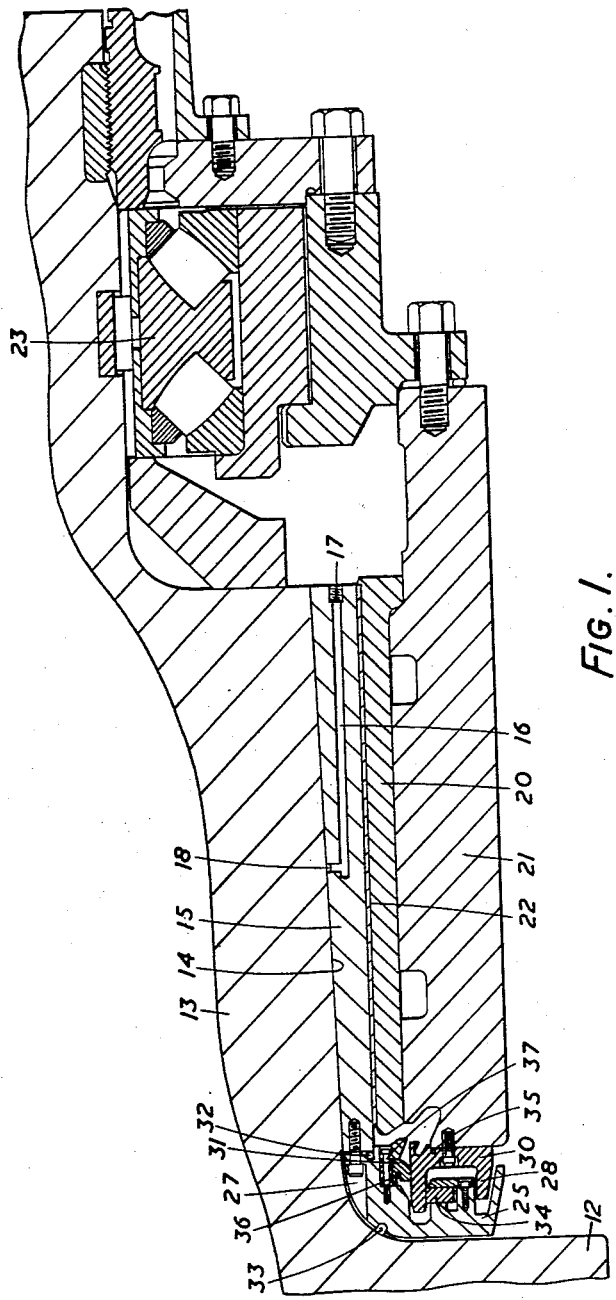
FIGURE 1 is a sectional view of part of the roll neck and of the bearing therefore.

In the drawings, the roll barrel is shown at 12, and the roll neck at 13. The roll neck or load-bearing member 13 has a 1/30 tapered surface 14 on which is secured a thin sleeve 15 having a correspondingly tapered bore. Sleeve 15 may be heat shrunk fitted or hydraulically shrunk fitted on the surface 14, in the latter case being provided with a duct 16 leading from an oil inlet 17 to an annular groove 18 opening to the internal surface of the sleeve.

The bearing for the roll neck 13 is constituted by the journal sleeve 15 and a bush 20 mounted in the roll chock 21 with a face to face fit. As usual, the internal surface of the bush 20 carries a thin layer of white metal 22. The roll neck 13 is also carried in the chock 21 by a roller type double thrust bearing shown generally at 23.

The journal sleeve 15 carries a seal for preventing roll coolant or lubricant entering the bearing and preventing lubricant from the bearing passing to the roll barrel 12 and subsequently to the rolled material. This seal comprises an extension ring 25 in co-operation with an inboard end plate 28. Extension ring 25 is bolted to the end of the sleeve 15 by bolts located in cut-aways as at 27 and the escape of oil is prevented by sealing rings 31, 32, 33, 34 and 35. Seal 31 is pressed against the inboard end plate 28 by garter ring 36 and is secured to the extension ring 25 by bolts 37. A duct 30 is provided to discharge any lubricant which may leak past seals 31 and 34 before it reaches the roll.

The assembly of the bearing will now be described:

The external surface of the journal sleeve 15 is reasonably well machined before mounting on the roll neck 13. The extension ring 25 is then secured to sleeve 15 and the latter is located on the tapered surface 14 of the roll neck. The oil inlet 17 is connected to an oil pump which forces oil between the adjacent surfaces of the roll neck 13 and of the sleeve 15 and causes the expansion of sleeve 15; while so expanded, the sleeve is forced along the taper, i.e., towards the left as viewed in the figure, so that when the oil pressure is removed, the sleeve is secured firmly onto the roll neck solely by being shrunk onto the surface 14. Alternatively the sleeve may be made undersize, heated, be passed on to the neck and allowed to cool.

Having been secured to the roll neck, the thin sleeve 15 conforms with the roll neck and effectively becomes an integral part of the roll neck, which is not removed until the useful life of the roll is finished. The external surface of sleeve 15 is ground truly round while located on the roll neck and before the roll is brought into service. Thereafter, the roll is supported by the sleeve 15 and a similar sleeve secured on the other roll neck and is ground cylindrical; this ensures that the roll barrel is concentric with the sleeves 15.

The bush 20 is mounted within the roll chock 21 by cold shrinking it into place. In other words, the bush 20 is cooled and fitted into the roll chock with reasonable clearances therebetween. On reaching ambient temperature, the bush 20 expands and is located in the chock with a face to face fit, the clearances between the bush and the chock being thereby eliminated. End plate 28 is secured to the chock and the roll neck is mounted within the bush 20. Lastly, the thrust bearing 23 is placed in position.

When the roll barrel 12 requires to be reground, the bearing is dismantled, the sleeve 15 being retained on the roll neck and the bush 20 within the chock 21. The roll is again carried by the sleeves 15 and reground. At the end of the life of the roll, the sleeve 15 with its extension ring 25 is removed from the roll neck, by expanding with oil under pressure and is similarly secured to the neck of a new roll. Sleeve 15 is forced further on the new roll than on the original roll, in order to bring the bearing surface of the sleeve oversize. This bearing surface is then machined back to the appropriate diameter to close tolerances. The bush 20 is removed from the chock by forcing liquid between the bush and chock 21 and thereby forcing the bush away from the chock surface.

Figure 2:
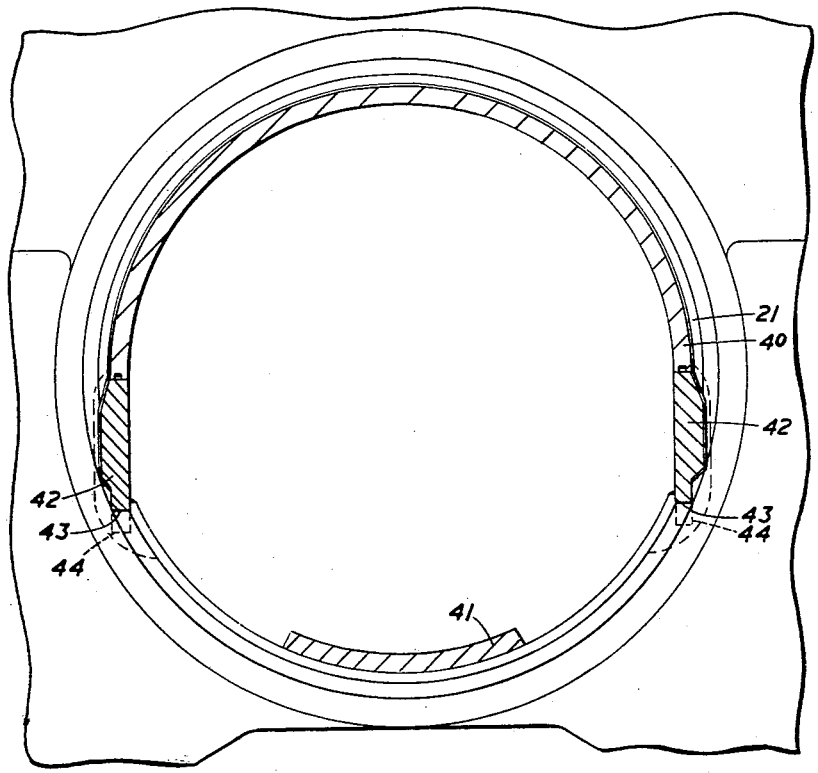
FIGURE 2 is a sectional view of an alternative form of bearing bushing.

FIGURE 2 illustrates an alternative way of locating a bearing in the chock 21 with a face to face fit. In this case a single bearing member 40 is used in conjunction with a support pad 41. A pair of wedges 42 having inclined surfaces 43 are located in slots 44 in chock 21 which slots have similar lower wedge surfaces. The bearing member 40 is located between the two wedges 42, and the wedges 42 are forced along their slots to apply pressure to the ends of the bearing members until the latter is forced into intimate contact with the chock surface.

The bush 20 may also be mounted in the chock 21 by having the bush in two parts which may be readily located within the chock and then forcing the two parts apart by wedges, so that they have a face to face fit with the chock.

Because the sleeve 15 is ground truly round after being mounted on the roll neck 13 and because the roll is carried by the sleeve 15 during grinding, the usual causes of eccentricity of the roll are avoided. Eccentricity is also avoided by dispensing with the usual key securing the sleeve to the roll neck, and instead using hydraulic shrink fitting. Also, the absence of clearances between the bush 20 and the chock 21 largely prevents variations in the separation of the bush 20 and sleeve 15 under load. As a result, the thickness of the material rolled is more likely to be constant.

Figure 3:
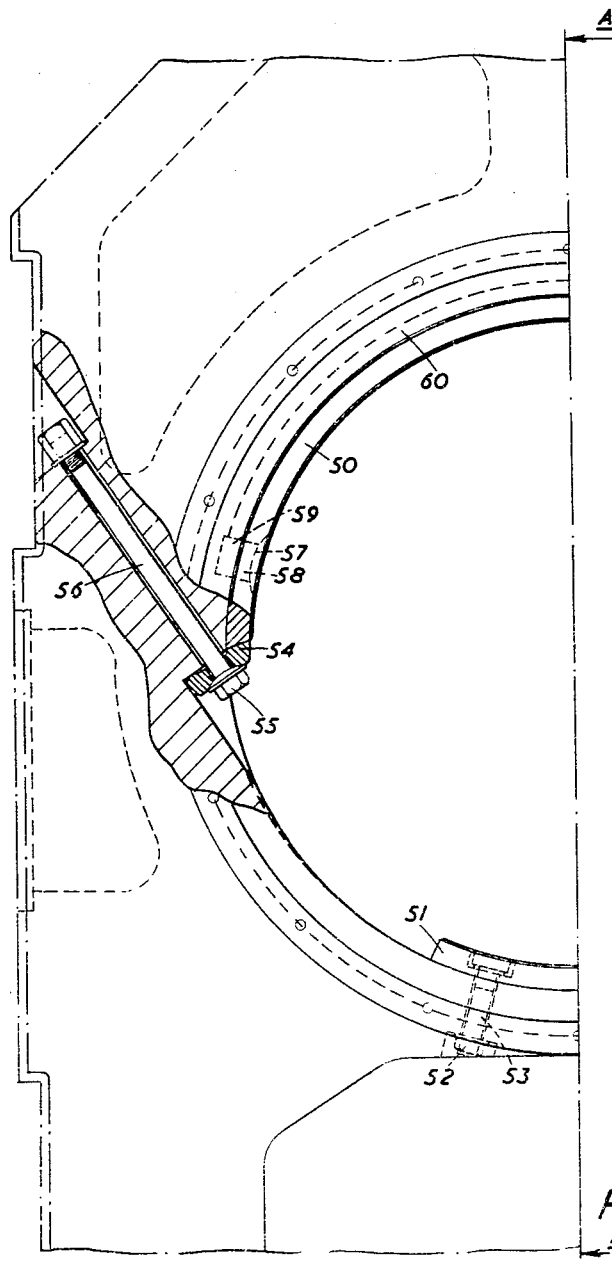
FIGURE 3 is a part sectional view on one side of the centre line of another form of bearing bushing.
Figure 4:
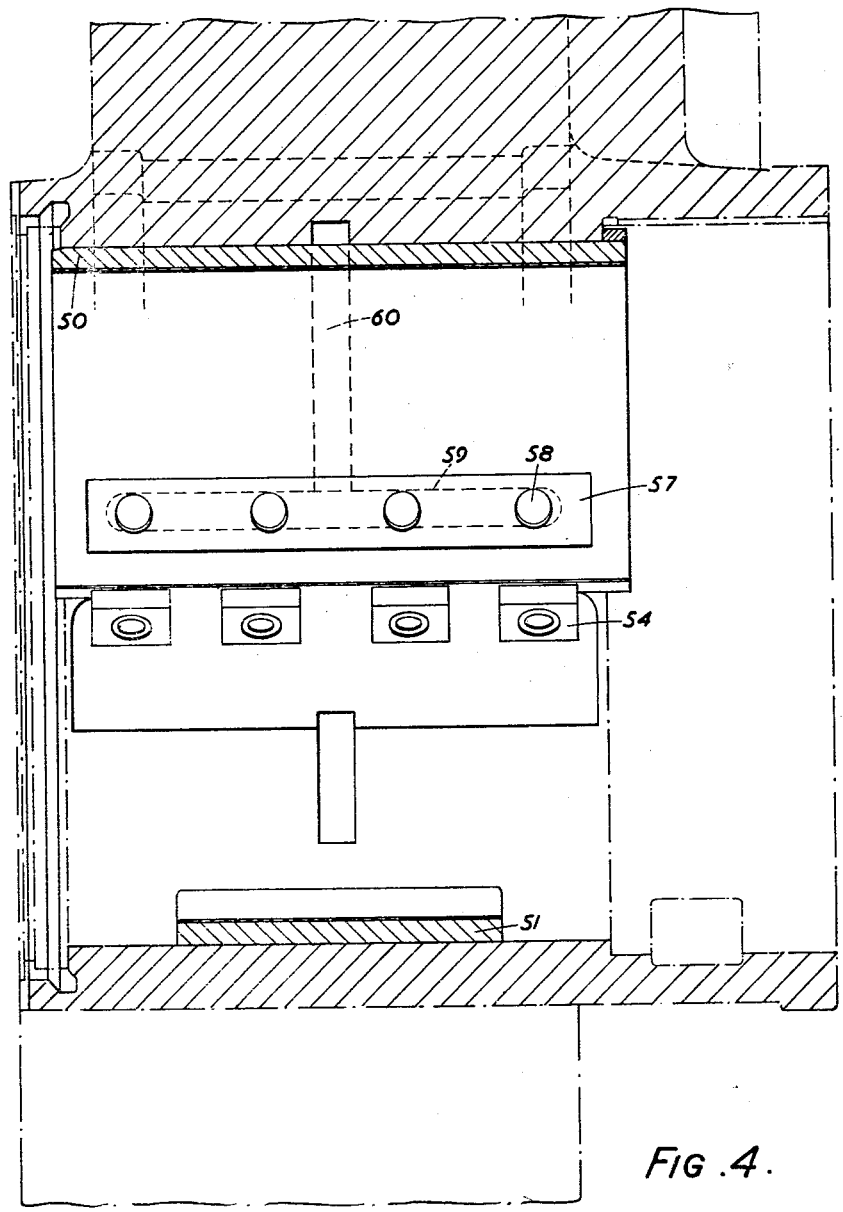
FIGURE 4 is a section on line A—A of FIGURE 3.

FIGURES 3 and 4 illustrate another way of locating a bearing in the chock 21 with a face to face fit. In this case a single bearing member 50 is used in conjunction with a support pad bearing member 51. The member 51 is attached to the chock by nuts 52 and bolts 53. The bearing member 51 is attached to the chock by nuts 52 and bolts 53. The bearing member 50 is forced into a face to face fit with the chock by means of a pad 54 and nuts 55 and bolts 56. The bearing member at each side is provided with a groove 57 in which are apertures 58 communicating with a groove 59 in the chock itself communicating with a feed groove 60 through which lubricating material for the bearing surface is pumped.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A method of making a rolling mill roll journal assembly comprising shrink fitting a thin sleeve onto a neck of the roll, machining the external surface of said thin sleeve until it is truly round, cold shrinking a bearing member into the bearing housing, then assembling the bearing housing and bearing member around the thin sleeve and neck.

2. The method of claim 1 comprising machining the external surface of the thin sleeve before shrink fitting the sleeve.

3. The method of claim 1 comprising grinding the external surface of the roll.

References Cited in the file of this patent

UNITED STATES PATENTS

| | | |
|---|---|---|
| 693,247 | Edwards | Feb. 11, 1902 |
| 1,746,129 | Robinson | Feb. 4, 1930 |
| 1,984,718 | Wistrand | Dec. 18, 1934 |
| 2,197,883 | Sinclair | Apr. 23, 1940 |
| 2,245,084 | Wood | June 10, 1941 |
| 2,582,433 | Hitchcock | Jan. 15, 1952 |
| 2,647,847 | Black et al. | Aug. 4, 1953 |
| 2,748,461 | Ohlsson | June 5, 1956 |
| 2,980,474 | Gargan | Apr. 18, 1961 |
| 2,983,554 | Caris et al. | May 4, 1961 |
| 2,992,479 | Musser | July 18, 1961 |